Nov. 29, 1960 E. J. KUMP 2,961,940

BUILDING MODULE

Filed June 13, 1957

10 Sheets-Sheet 1

ERNEST J. KUMP
INVENTOR.

BY Flehr & Swain
ATTORNEYS

ERNEST J. KUMP
INVENTOR.

BY Flehr & Swain
ATTORNEYS

ERNEST J. KUMP
INVENTOR.

BY Flehr & Swain
ATTORNEYS

Nov. 29, 1960

E. J. KUMP 2,961,940

BUILDING MODULE

Filed June 13, 1957

10 Sheets-Sheet 4

ERNEST J. KUMP
INVENTOR.

BY Flehr & Swain
ATTORNEYS

Nov. 29, 1960 E. J. KUMP 2,961,940

BUILDING MODULE

Filed June 13, 1957 10 Sheets-Sheet 5

ERNEST J. KUMP
INVENTOR.

BY Flehr & Swain
ATTORNEYS

Nov. 29, 1960 E. J. KUMP 2,961,940

BUILDING MODULE

Filed June 13, 1957 10 Sheets-Sheet 6

ERNEST J. KUMP
INVENTOR.

BY Flehr & Swain
ATTORNEYS

Nov. 29, 1960 E. J. KUMP 2,961,940

BUILDING MODULE

Filed June 13, 1957 10 Sheets-Sheet 7

ERNEST J. KUMP
INVENTOR.

BY [signature]
ATTORNEYS

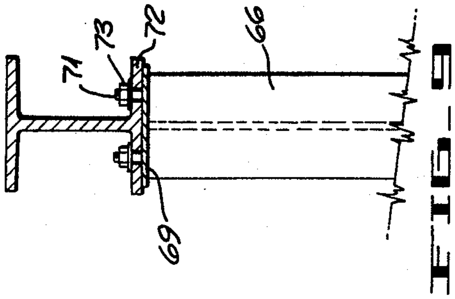
FIG. 9
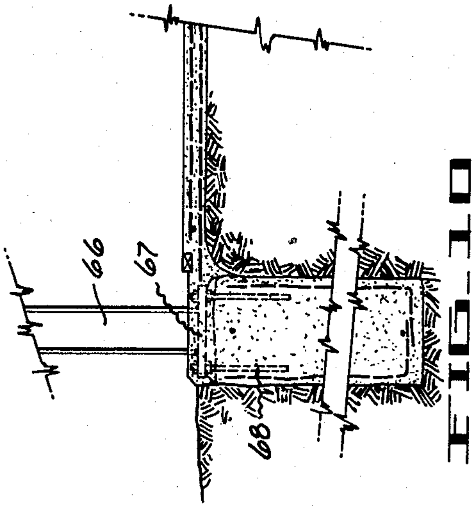
FIG. 10
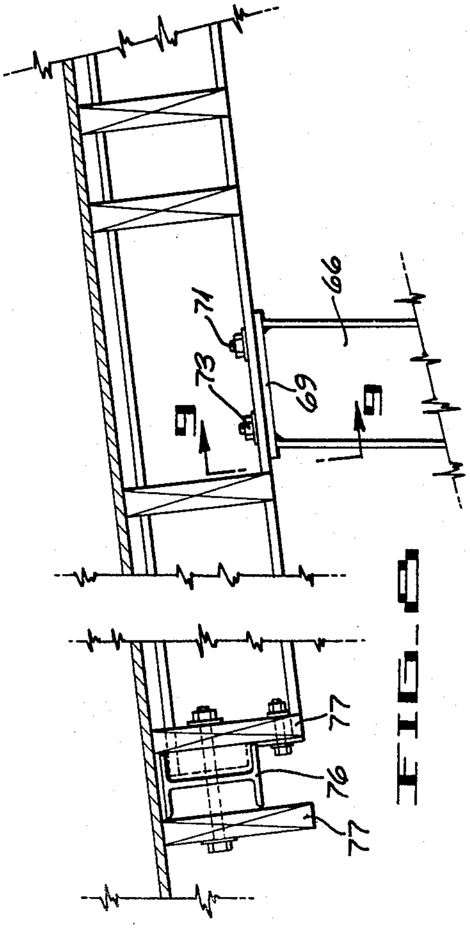
FIG. 6
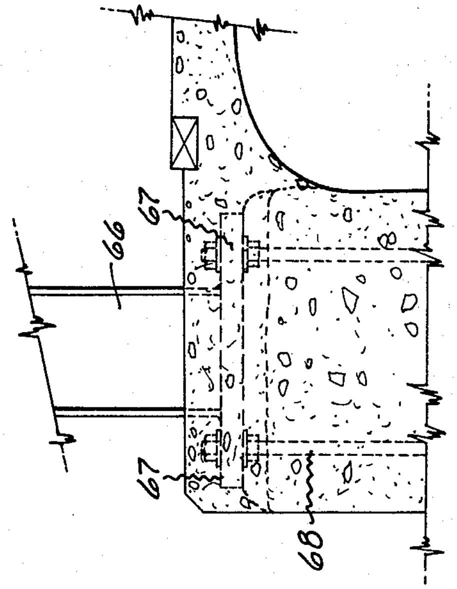
ERNEST J. KUMP
INVENTOR.
BY Flehr and Swain
ATTORNEYS

ERNEST J. KUMP
INVENTOR.

BY Flehr and Swain
ATTORNEYS

Nov. 29, 1960 E. J. KUMP 2,961,940

BUILDING MODULE

Filed June 13, 1957 10 Sheets-Sheet 10

ERNEST J. KUMP
INVENTOR.

BY [signature]
ATTORNEYS 2,961,940

BUILDING MODULE

Ernest J. Kump, Los Altos, Calif.
(929 Arastradero, Palo Alto, Calif.)

Filed June 13, 1957, Ser. No. 665,463

3 Claims. (Cl. 98—33)

This invention relates generally to a building module and more particularly to a school building module.

In general, school buildings are individually designed. The designer attempts to take into account climatic conditions, site conditions, educational program, and anticipated enrollment and then makes an integrated plan for the school buildings.

A plan which has found wide acceptance in recent years is the finger plan which includes a plurality of elongated buildings having a single loaded corridor running the length of the finger with corridors interconnecting the various fingers. In this type of construction, the depth of the rooms is not flexible. It is limited generally by the necessity of maintaining proper proportions. Modified plans have been designed, however the cost is greatly increased.

It is desirable in a school building construction that the design be standardized whereby similar buildings may be constructed for use at various sites and locations. This will result in significant speed and economy of construction compared to conventionally designed buildings, due to efficiency for builders in fabricating and assembling repetitive standardized components. Further, within the building there must be wide flexibility so that various types of activities may be accommodated.

It is a general object of the present invention to provide a school building module which provides wide flexibility as to activities which it will accommodate and which can be combined multilaterally with other modules to form a pleasing and functional school design.

It is another object of the present invention to provide a building module which permits subdivision to form a wide variety of rooms to accommodate a large number of activities and which are each suitably lighted and ventilated.

It is another object of the present invention to provide a building module in which the basic building parts such as heating, ventilating, structural elements, etc., are standardized and in which the room divisions may be easily inserted.

It is a further object of the present invention to provide novel means for supporting the roof of the building module of the invention.

It is another object of the present invention to provide a building module which is adapted to resist horizontal forces with greater economy than in conventional construction.

It is still another object of the present invention to provide a building module in which the heating, ventilating, etc., are standardized for all building modules regardless of their ultimate use.

It is still another object of the present invention to provide a building module in which the walls are formed of adjacent panels which may be prefabricated and then lifted into place at the site.

It is another object of the present invention to provide a novel building panel for use in buildings of the above character.

It is another object of the present invention to provide a building module in which the utilities are carried in a raceway at the ceiling.

It is another object of the present invention to provide a building module in which the utility system is independent of systems serving other buildings.

These and other objects of the invention will appear more clearly from the following detailed description when taken in connection with the accompanying drawings, showing by way of example, a preferred embodiment of the inventive idea.

Referring to the drawings:

Figure 8 is an enlarged view of the portion 8—8 of Figure 3 and showing the connection between the vertical support columns and the transverse roof beams;

Figure 9 is a view taken along the line 9—9 of Figure 8;

Figure 10 is an enlarged view of the connection of the vertical columns to the foundation; it shows generally the portion 10—10 of Figure 3;

Figure 1:
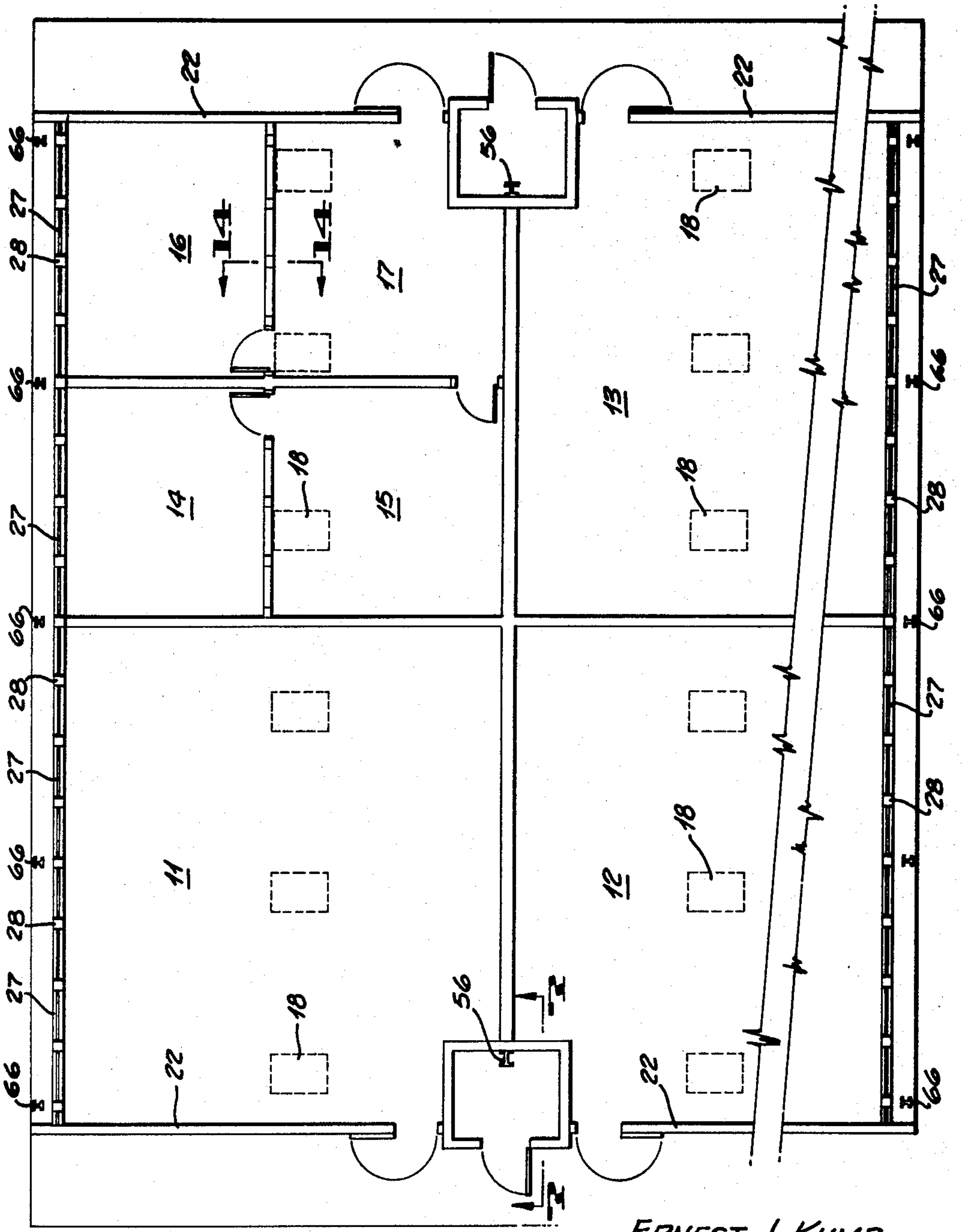
Figure 1 shows one floor plan which may be incorporated in the building module of the invention.

Referring to Figure 1, a typical floor plan of a building module is shown. The module is divided up into three classrooms 11, 12 and 13, and includes three offices 14, 15 and 16, with a waiting room 17. The skylights 18, to be presently described, are shown in dotted outline. It is apparent that all the offices and classrooms have natural lighting, either from the skylight or through the windows in the side and end walls of the building.

Figure 2:
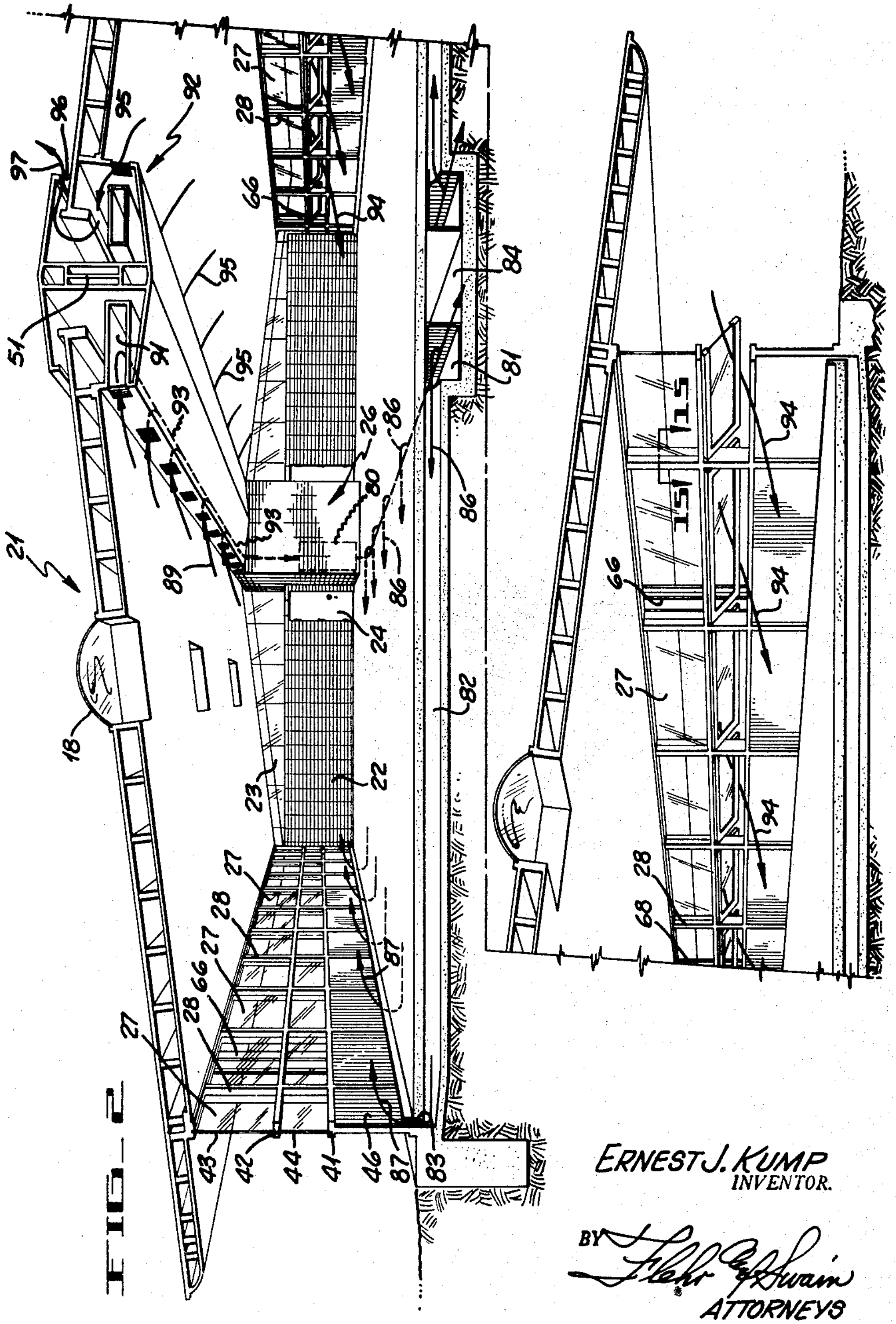
Figure 2 is a perspective view showing the building module, showing the panel construction of the walls, and the systems of mechanical heating and ventilation, and natural ventilation incorporated in the module.

Referring to Figure 2, a perspective view of the building is shown. The roof 21 is of frame construction and will be presently described in detail. A plurality of the skylights 18 are provided in the roof to permit natural lighting of the central portions of the building, as previously described. The end walls 22 may be constructed of any suitable material and, as shown, are masonry walls which extend upwardly from the floor. These walls are preferably cantilevered from the foundation. At their upper end they are provided with windows 23 which extend between the top of the wall and the ceiling. Doors 24 may be suitably located to permit ingress and egress to the various rooms. A mechanical room 26, to be presently described in detail, is formed at one end of the building and serves to house the mechanical heating and ventilating components.

The side walls of the building are formed by a plurality of adjacent panels 27. These panels are of standard width and dimensions and may be erected at a factory or mill and then transported to the job where they are raised into place and suitably secured at the floor and ceiling. As shown, the panels 27 are placed adjacent one another and form mullions 28. The mullions 28 are so formed that adjacent mullions provide a raceway for electrical conduits or other utility service piping.

Figures 14, 15, 16, 17:
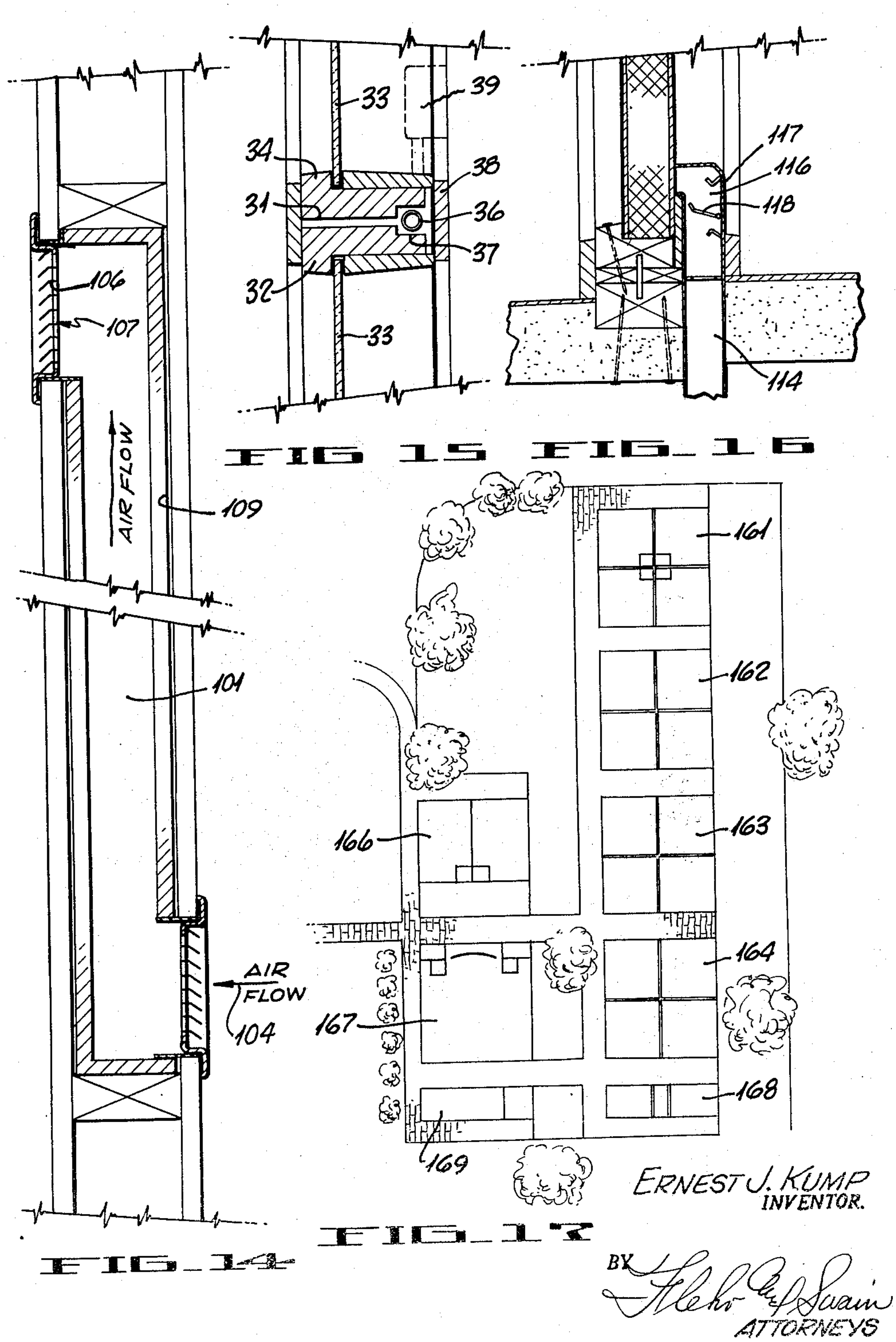
Figure 14 is an enlarged view taken along the lines 14—14 of Figure 1 and shows a partition duct.
Figure 15 is an enlarged view taken along the line 15—15 of Figure 2 and shows the mullion formed by two adjacent panels.
Figure 16 is an enlarged view of a panel showing incorporation of a heat register.
Figure 17 is a plan view of a typical school incorporating a plurality of the building modules of the invention.

Figure 15 is a sectional view taken along the line 15—15 of Figure 2 and shows the mullion in detail. The panel frame includes suitable wood members 31 and 32, one for each of the adjacent wall panels. The glass 33 is held between the stop 34 of members 31 and 32 and stop 35. The conduit 36 extends along the members 31 and 32 in the raceway 37 formed by the cutout portions. The conduit or utility service piping 36 is concealed by the casing strip 38. At the proper height the conduit is connected to the outlet 39. Thus, it is seen that each of the mullions is provided with a raceway for the conduit. The entire assembly is covered to conceal the conduit and give a pleasing appearance.

As shown, the panels 27 are divided up into three sections by the muntins 41 and 42. On the left hand side of Figure 2 windows 43 and 44 are fixed and a suitable panel 46, for example, of wood, forms the bottom portion of each of the building panels 27. It is, of course, apparent that more or less muntins 41 and 42 may be employed and that the panel may be divided in other suitable sizes. For example, the wooden portion 46 may extend upwardly a considerable distance leaving a small window opening. Similarly, other types of arrangements which give the desired appearance and functionality to the building may be employed. Referring, for example, to the right hand side of Figure 2, the center glass panel is provided with a sash which opens outwardly and provides natural ventilation. The panels may also be constructed to include door openings so that doors may be provided along the sides of the building as desired. It is apparent to one versed in the art that many combinations of glass and other materials may be employed to form a variety of panels 27. The selection of materials and design of the building panels will depend upon the particular use of the building module and the desired external and internal appearance of the walls.

It is apparent that the relatively weak side and end walls do not provide support for the roof. They merely provide means for enclosing the space defined by the floor and the roof of the module.

The diaphragm type room includes a longitudinal ridge beam 51 (Figures 2, 3, 4 and 6) and a plurality of transverse roof beams 52 (Figures 3 and 4) suitably attached thereto. The transverse beams may be welded to the longitudinal beam or bolted to plates which are welded thereto or attached by other means suitable to the material employed, providing simple connections.

It will be apparent to one versed in the art that many types of materials may be employed to form the structural system, for example, precast concrete columns and beams, wood columns and beams, other configurations of steel and metal columns and beams and combinations of the foregoing. Throughout the present description reference is made to steel beams. However, it is to be understood that the invention is not to be limited in this respect and that this is done only for purposes of clarity.

Figure 4:
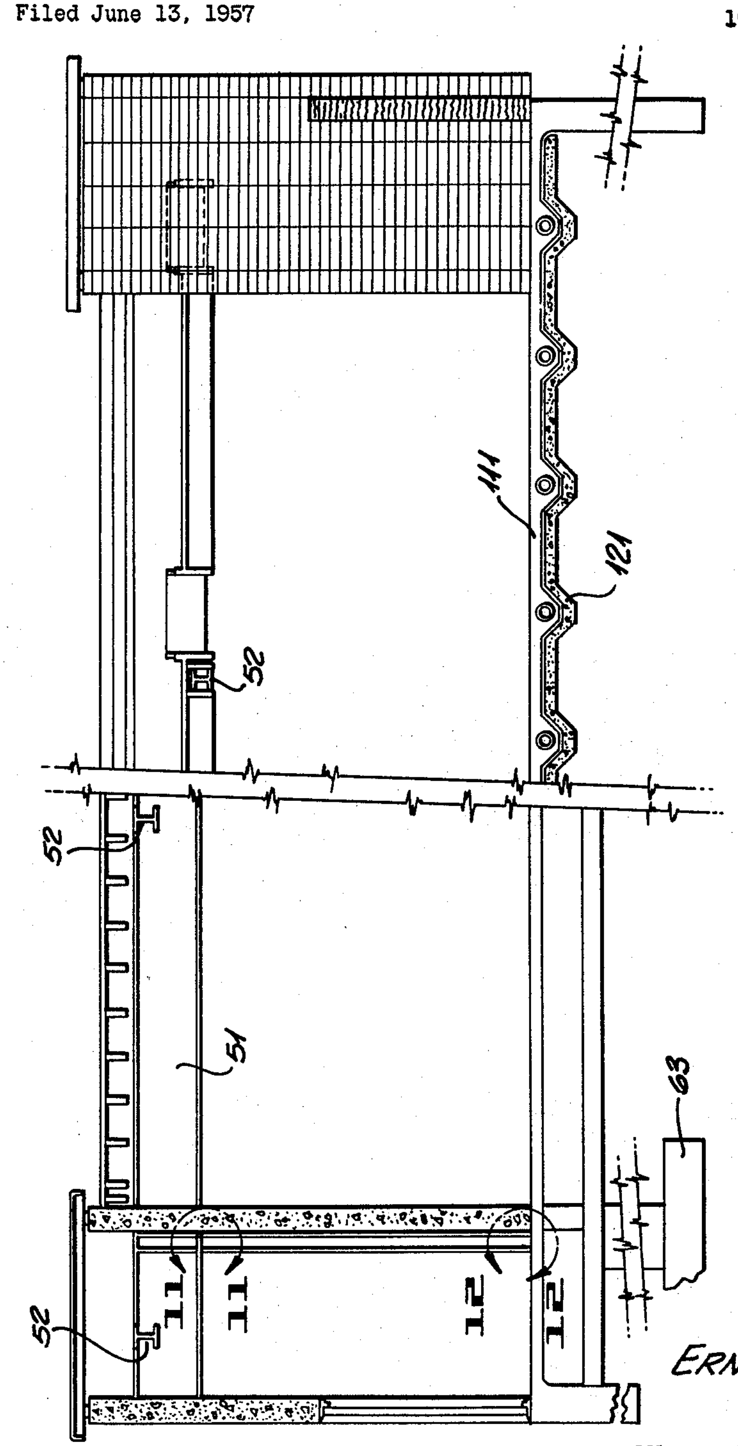
Figure 4 is a longitudinal sectional view taken partly along the ridge and partly along the skylights of the building.
Figure 11:
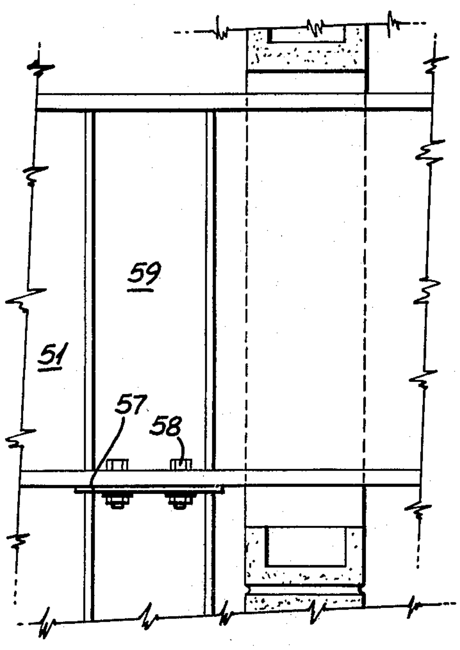
Figure 11 shows the connection between the ridge beam and the vertical ridge columns; it shows generally the portion 11—11 of Figure 4.
Figure 12:
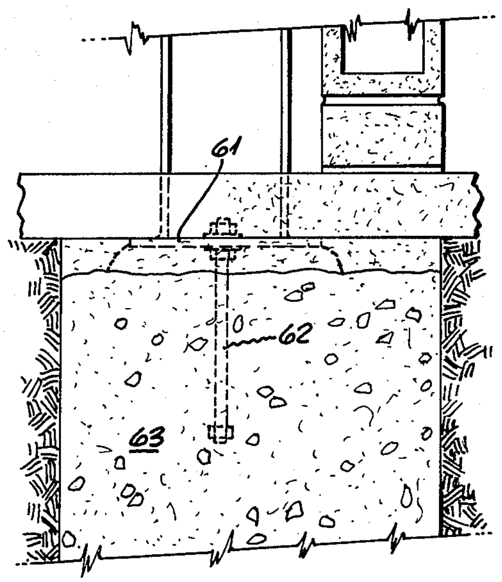
Figure 12 shows the connection of the ridge column to the footing and shows generally the portion 12—12 of Figure 4.
Figure 13:
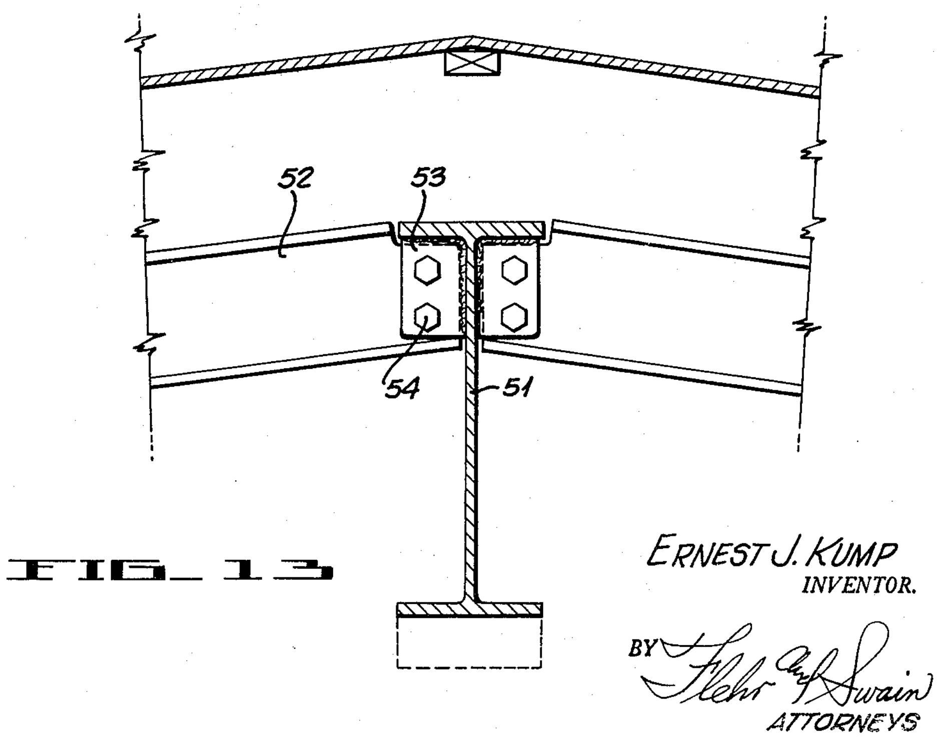
Figure 13 is a view showing the connection of the transverse roof beams to the ridge beam.

Referring particularly to Figure 13, suitable beams and connections are shown. Thus, the angle plates 53 have their one edge welded to the web of the ridge beam 51 and have their other edges suitably bolted to the end web portions of the transverse roof beams 52 by the bolts 54. The ends of the ridge beam 51 are engaged by the vertical ridge columns 56. Referring to Figures 4 and 11, a suitable connection between the ridge columns 56 and the ridge beam 51 is illustrated. Thus, a plate 57 is welded to the end of the column. The plate is then suitably bolted 58 to the plate of the beam 51. Stiffener plates 59 are provided between the plates of the ridge beam above the connection to the ridge columns. The lower end of the ridge column is welded to a plate 61. Bolts 62 are suitably secured to the plate and extend downwardly and are embedded in the concrete foundation 63. It is to be noted that the connections to the two ends of the ridge column are simple connections and are not designed to withstand any bending movements. Consequently, the roof may move transversely or longitudinally with respect to the foundation. The ridge columns merely serve to provide vertical support for the ridge beam.

Figure 3:
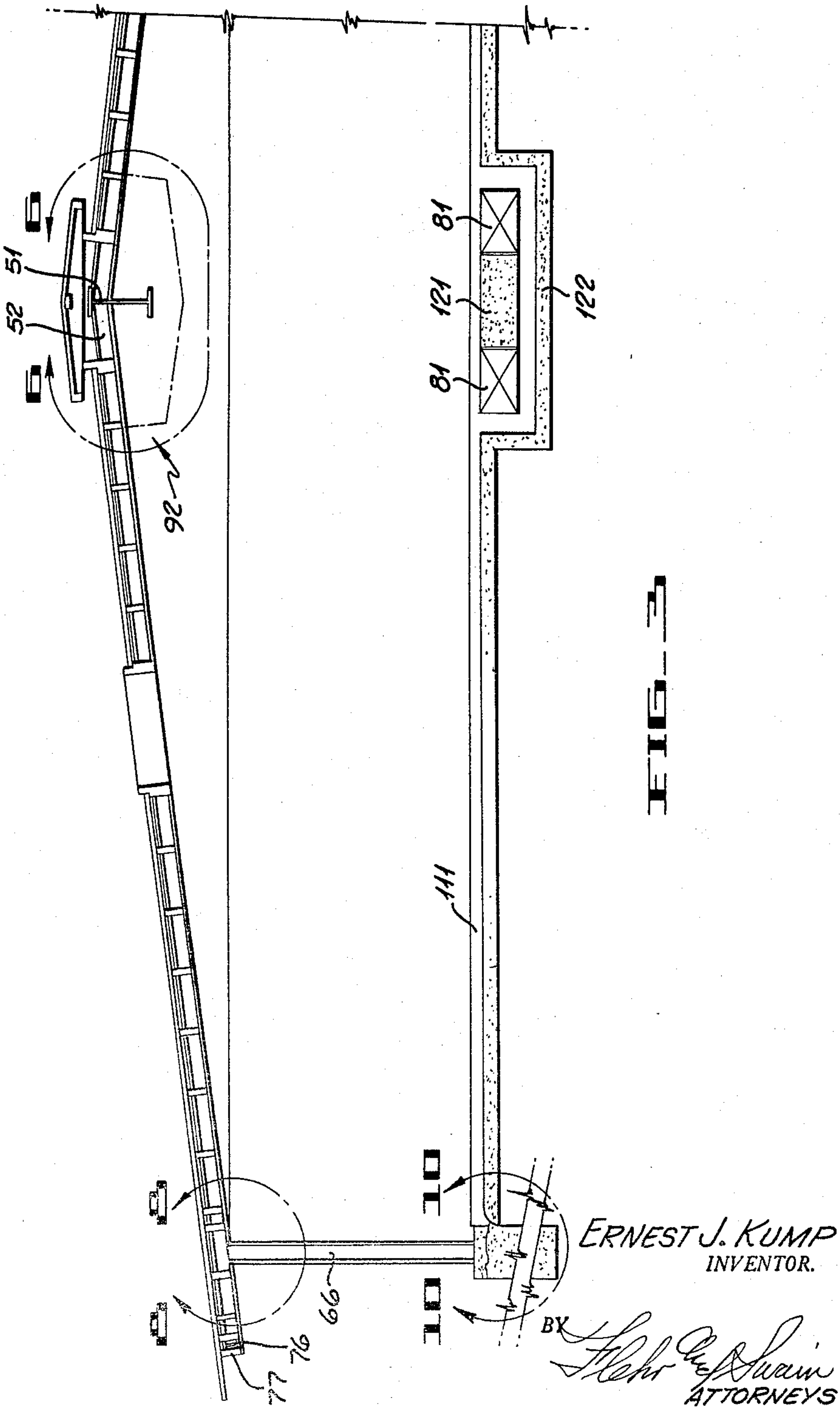
Figure 3 is a cross-sectional view showing the floor, roof and the vertical supporting columns which serve to support the roof.

The other ends of the transverse roof beams are engaged by vertical columns 66 which are cantilevered from the foundation or footing to engage the beams near their ends. The columns 66 are rigidly secured to the foundation whereby they cantilever upward. Referring particularly to Figures 3 and 10, a suitable connection to the foundation is illustrated. A steel plate 67 is suitably welded to the base of the column. A plurality of bolts 68 is suitably secured to the plate and extends downwardly into the foundation a considerable distance. The plate is buried in the concrete which forms the foundation. As a result, the column is rigidly held whereby it is cantilevered on the foundation. The columns are chosen of material which is relatively rigid and extend upwardly where they engage the transverse beams.

Referring particularly to Figures 3, 8 and 9, the simple connection to the transverse beams is shown in detail. The upper portion of the beam is provided with a plate 69 which includes studs 71. The studs extend upwardly through the plate 72 of the transverse beams 66 and are suitably secured thereto by the nuts 73. The connection is a simple connection. It holds the roof from sliding relative to the column. However, the connection is not designed to prevent any rotational movement of the roof with respect to the column. Thus, if such movement should ensue, the stud would snap. However, since the columns are relatively rigid, the roof is firmly held against transverse movement with respect to the floor.

A strut 76 which reinforces the ends of the roof extends on the peripheral edge of the same and is suitably secured to the joists 77. The construction of the roof includes a plurality of framing members arranged in a conventional manner to form a diaphragm type roof. The roof structure shown is relatively rigid thereby preventing any twisting movement of the roof and greatly reinforcing the structure. As a result of this rigidity the ridge columns need only have simple connection to the foundation and to the ridge beam.

Thus, it is seen that the roof is rigidly supported from the plurality of rigid columns which extend upwardly and engage the ends of the transverse roof beams. The building construction is in the form of an umbrella under which the various interior and exterior walls are placed. This type of construction is particularly adapted to resist horizontal forces, such as those generated by earthquakes. The panel type wall construction previously described may be employed since it need only be self-sustaining. Similarly, the end walls may be cantilevered upward from the floor and provided with various types of windows between the walls and ceiling. The walls serve to provide protection from the elements and to impart a pleasing appearance to the building in which the space is defined by the roof and floor. Walls may be located within the building as desired by suitably securing the same to the floor and ceiling in a conventional manner.

To provide complete flexibility to the module, it is desirable to provide a heating and ventilating system which serves to heat the complete module regardless of the manner in which it is subdivided. Thus, another novel feature of the invention is the provision of a standardized heating and ventilating system for use in conjunction with building modules.

Referring first to Figure 2 wherein the flow of air is schematically depicted by the arrows, the left hand side of the figure represents a mechanically heated and ventilated module, while the right hand side depicts a naturally heated and ventilated module. It is, of course, to be understood that both types of heating and ventilation are preferably included in a single module.

Figure 7:
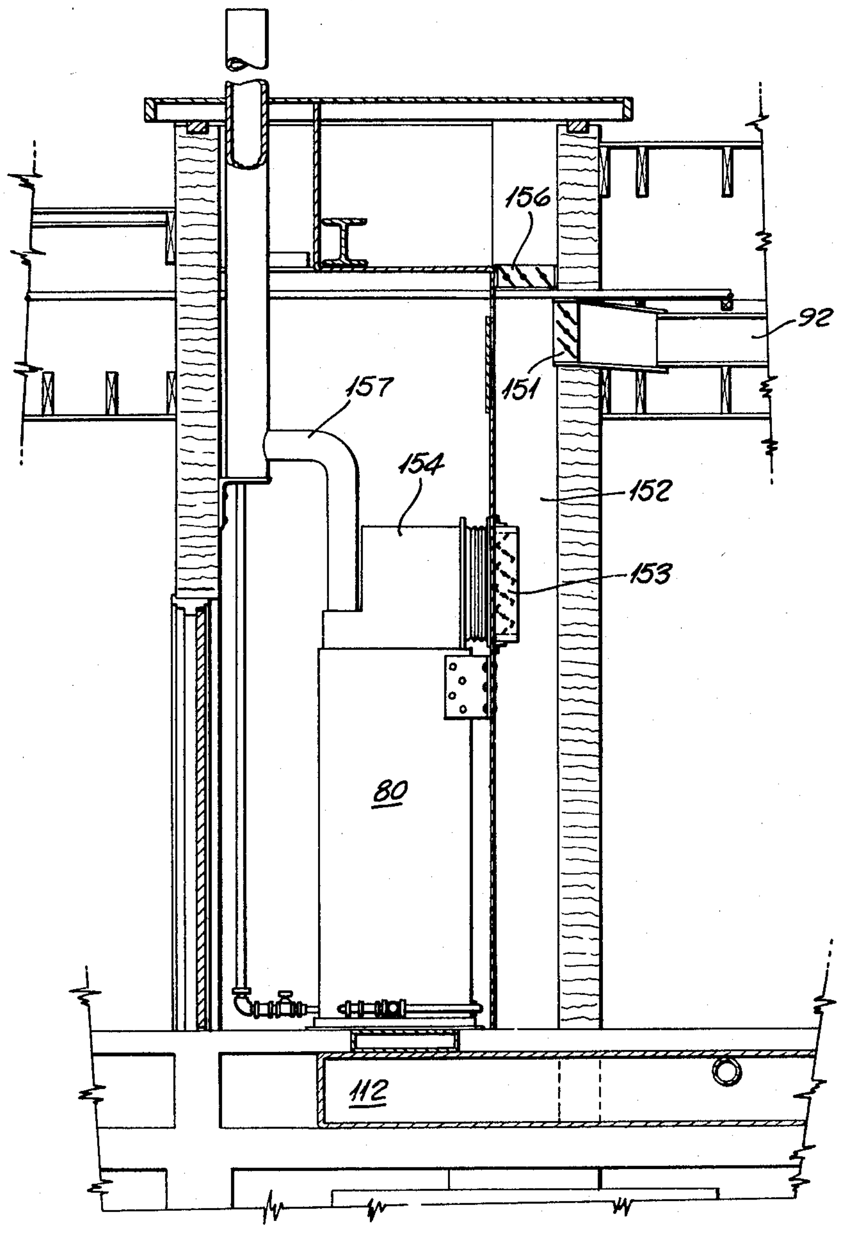
Figure 7 is an enlarged view taken generally along the lines 7—7 of Figure 1 and showing the mechanical room.

Referring particularly to the mechanical side, the mechanical unit 80 shown in more detail in Figure 7 and to be presently described, serves to circulate air along the plenum 81 which is disposed along the center and beneath the floor. A plurality of transverse ducts 82 are also located below the floor and connect between the plenum and registers 83 which are accommodated in the panels 27. Thus, the air flows along the plenum and outwardly along the ducts 82. The air flowing along the ducts 82 serves to heat or cool the floor thereby providing radiant heating. The flow of air along the plenum and ducts and at the registers is indicated by the arrows 84, 86 and 87, respectively.

The air then flows inwardly into the room and upwardly where it travels into alternate ones of the registers 88 as indicated by the arrow 89. The air then flows along the return duct 91 located in a raceway, which is indicated generally by the reference numeral 92, and which will be presently described in detail, to the mechanical unit 80 as indicated by the dotted line 93. A similar mechanical system is duplicated on the right hand side of the building. Preferably, a pair of mechanical units is provided whereby the heating and ventilation on each side of the building may be independently controlled. The mechanical unit 80 may include both a furnace unit and a refrigeration unit whereby the environment in the building module may be suitably controlled. However, it is apparent that a single mechanical unit may be employed and that the control of the dampers associated therewith may be effected to balance the heating and ventilation on the two sides of the building module.

Referring to the right hand side of the drawing, panels 27 are shown including a plurality of sashes which may be opened outwardly or inwardly and allow fresh air to flow into the room as indicated by the arrows 94. The air then travels into the room and flows upwardly as indicated by the arrows 95 into alternate ones of the registers 88 where it travels around the return ducts 91 and through the ridge vent 96 as indicated by the arrows 97. It is apparent then that the two types of heating and ventilation may be combined in a single building module whereby the module may be maintained with desired environmental conditions throughout the year. It is to be further noted that all the rooms within the module are provided with natural ventilation either through the sash in the side walls or through the ridge vent.

When room partitions are inserted as shown, in Figure 1 for example, means must be provided whereby the air may flow when walls are interposed between the supply or wall registers and the return or ceiling registers. It is apparent that a wall extending longitudinally of the building along the center line will not interfere since independent heating is provided on the two sides of the building. Transverse walls will not appreciably effect the heating since the heat flow is transversely across from the sides to the center of the building. However, if partition walls are located between the center and side walls of the building, they will block flow of air unless provisions are made for the flow of air through the partition walls.

Referring particularly to Figures 1 and 14, such a suitable means is shown. A plurality of ducts 101 is provided in each of the longitudinal walls 102 and 103. These ducts have a lower grill opening where the air flows inwardly as indicated by the arrow 104. The air then flows upwardly between the wall panels and outwardly from the grill 106 as indicated by the arrow 107. The inside of the duct 108 may be suitably insulated with acoustical insulation 109 which prevents noises from travelling from one room to the adjacent room. A less elaborate arrangement may be employed where acoustical insulation is not required. In such instances the duct may travel straight across the wall with grills provided at the two sides of the duct.

In general, a sufficient number of these intercommunicating ducts are provided to accommodate volume-wise the amount of air which is fed into the room along the registers located along the side walls of the building.

Figure 5:
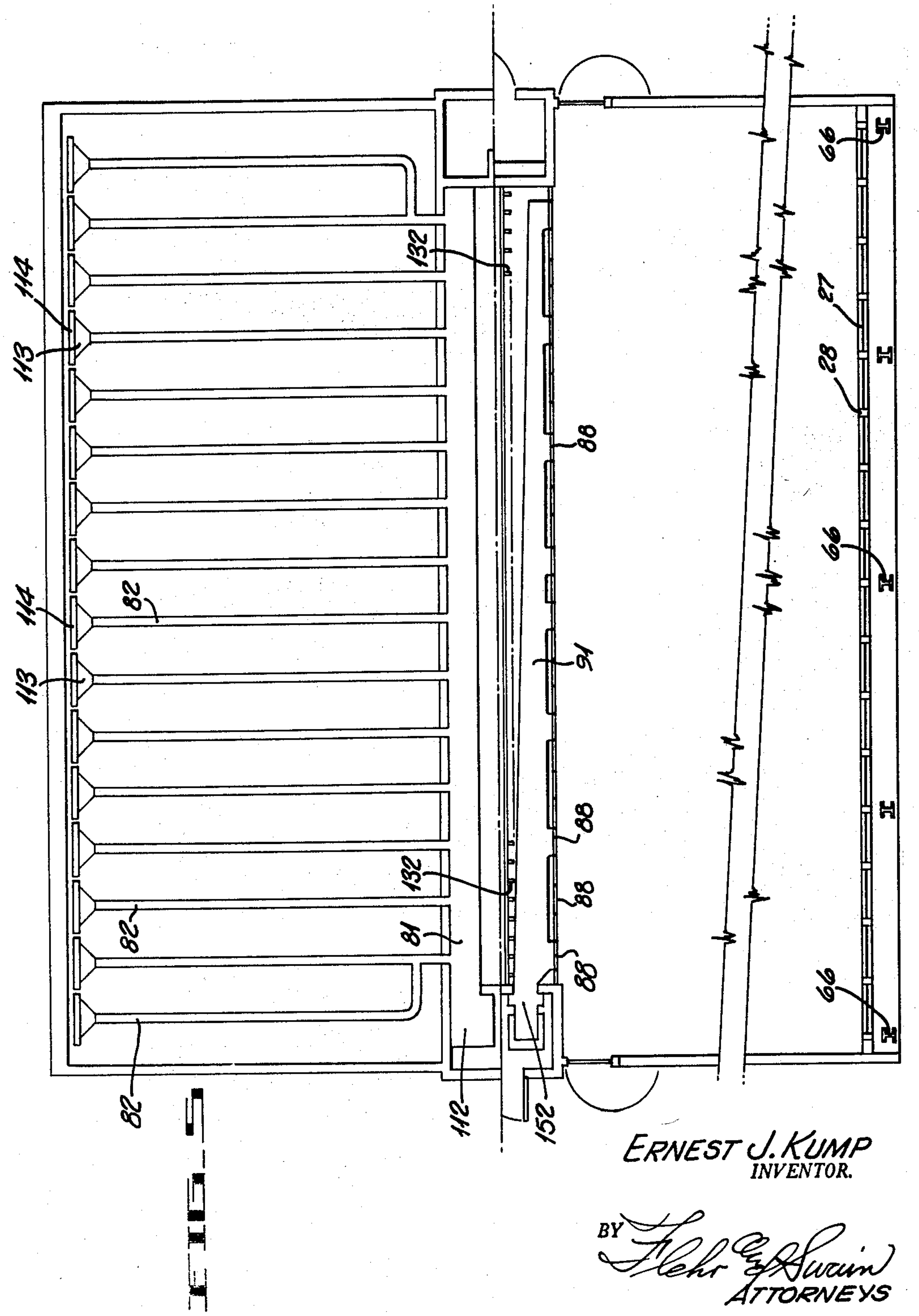
Figure 5 is a plan view showing the heating and ventilating plan.
Figure 6:
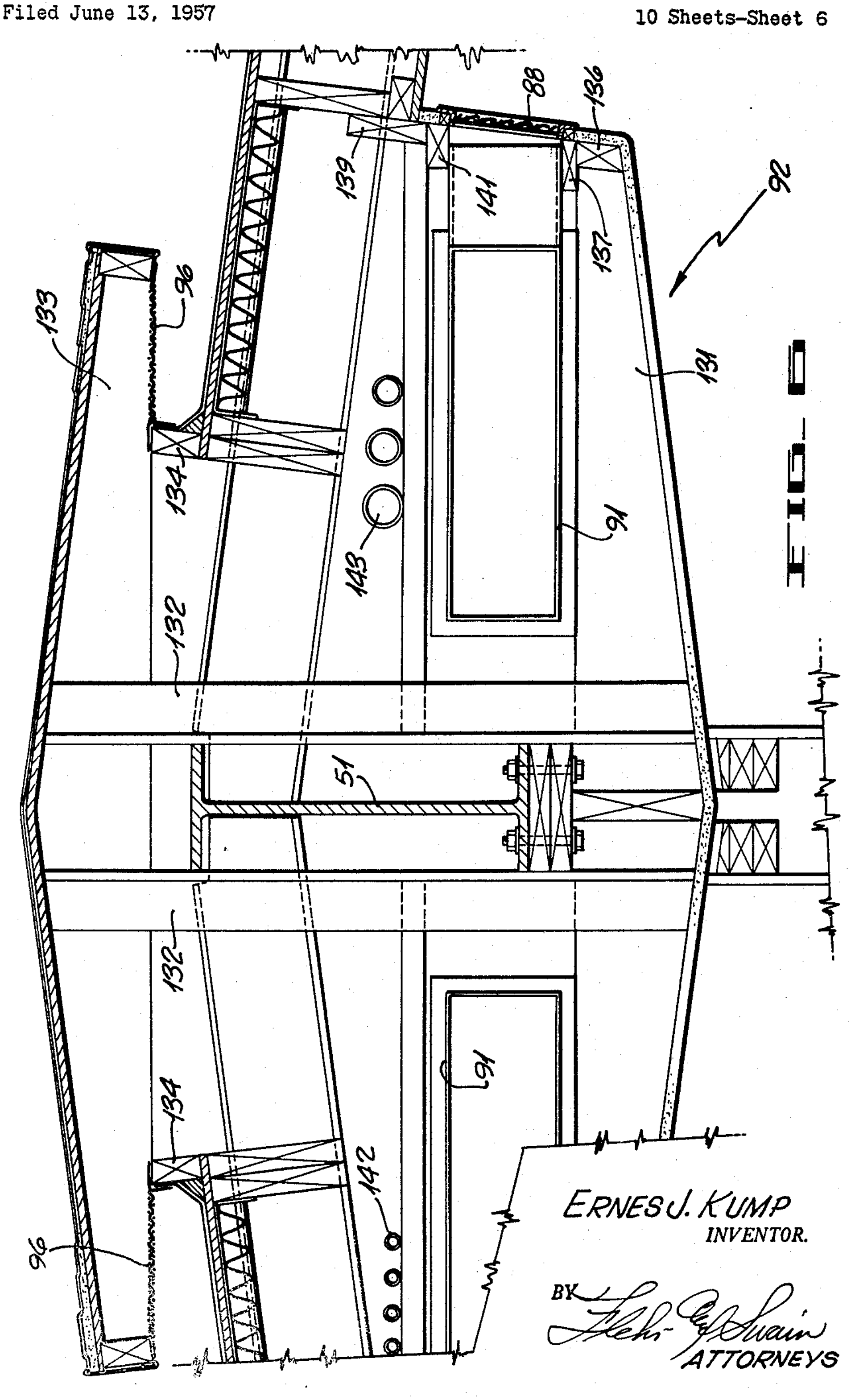
Figure 6 is an enlarged sectional view taken along the lines 6—6 of Figure 3 and showing the ridge raceway and ridge vent.

Referring particularly to Figures 3, 5, 7, the plenum and transverse ducts are shown in detail. Thus, the plenums 81 are disposed below the floor 111 and extend longitudinally of the building. The mechanical unit 80 is suitably connected 112 to the adjacent end of the plenum to supply the air to the plenum. The transverse ducts 82 are in communication with the plenum at spaced points along the plenum from one end of the building to the other. The ducts 82 extend transversely outwardly and are provided at their ends with a boot 113 which has an end portion 114 which extends upwardly to the upper edge of the floor 111. The wall panels which are placed above the upwardly extending portion 114 of the boot (Figure 16) accommodate a baseboard register 116. The register includes a removable face 117 and damper 118. The lower portion of the register 116 is adapted to engage the upwardly extending portion 114 of the boot to form a connection therewith. The complete assembly is then enclosed within the panel. Thus, it is seen that along the outside walls the heat registers are incorporated within the panels and only the grill shows in the adjacent room.

Referring to Figure 3, the remainder of the foundation is illustrated. Rock fill 121 is placed between the plenums and on the surface of the ground. Concrete is then poured over the fill and forms the floor 111. The concrete also serves to encase the plenums and transverse ducts (Figures 3 and 4).

The raceway 92 (Figures 2, 3, 5 and 6) serves to support the return ducts and the utility conduits and pipes. The utilities are available for connection to adjacent buildings. Connections from the utility lines to various portions of the building are facilitated since they are accessible in the raceway. At the same time, utility systems for each building module are independent and sufficient for each such building module and distinct from mains serving other building modules in a group.

The return ducts are carried by members 131 which are generally triangular in form. These members are suitably secured to hangers 132. The upper ends of the hangers are secured to joists 133. The joists 133 are supported on the member 134 which extends longitudinally of the building. Longitudinal members 136 and 137 are secured to the ends of the members 131 and provide means for supporting the return ducts which extend from alternate registers 88 to the return air ducts 91. This arrangement of short ducts communicating with the return duct is more clearly shown in Figure 5 where alternate ones of the registers 88 are shown connected to the return duct. Longitudinal members 139 and 141 serve to support the upper portion of the registers. Struts 142 extend across the raceway and are connected to opposite members 139, 141. The struts carry the utility conduits and pipes 142, 143. A ridge vent is formed between the member 134 at the ends of the joist members 133 and the member 134. This opening is covered with suitable metal cloth or other open mesh material and forms the fresh air vent 96. Alternate ones of the registers 88 communicate through the raceway with these vents to the outside. The complete arrangement is more clearly illustrated in the schematic diagram of Figure 2.

Referring now to Figures 5 and 7, the return ducts taper from the mechanical unit to the other end. This provides an equal vacuum at each of the vents to thereby control the flow of air. The air flows along the heating and ventilating ducts 91 through the return air damper 151 downwardly in the duct 152 through the fire shutter 153 through the adaptor 154 and into the mechanical unit. An outside air damper 156 is also provided whereby the ratio of outside to return air may be controlled. A flue 157 extends upwardly from the furnace through the vent formed at the top of the mechanical room.

Thus, it is seen that an improved building construction has been provided. A self-supporting umbrella-like space defining module includes both mechanical and natural heating and ventilation. The building module may be provided with any desired end and side walls. For example, the side walls may be of a panel construction which may be fabricated at a factory. The panels include registers which serve to interconnect with the heating system of the building shell.

The complete structure is relatively rigid and yet permits movement of the roof under earthquake loads and the like since the vertical columns which support the roof are cantilevered from the concrete wall footing and the connection to the roof is merely a shear connection.

The building module is easily subdivided into any desired useful space, for example, administration offices, kindergartens, etc.

Thus, with one type of space defining module which includes its own environment, a complete school system may be designed. For example, referring to Figure 17, such a school system is shown. It includes six building modules of the type described. The modules 161, 162, 163 and 164 are divided up into classrooms while the module 166 provides a kindergarten room and the module 167 an auditorium. The smaller modules 168 and 169 which are likewise constructed in accordance with the invention may provide lavatory facilities and kitchen facilities, if desired.

In this respect, it is to be noted that the invention is not to be limited to a particular size or shape of building module but that the invention contemplates the use of standardized building modules of desirable shape for use in constructing buildings. Each of the modules is to consist of a space defining shell to which interior and exterior walls may be added to give a suitable external appearance and to form the desired type of rooms. Each of these modules should be relatively well adapted to be placed in a group to permit the best use of the site and to provide a functional design and pleasing appearance.

I claim:

1. A building comprising a roof structure including a longitudinal ridge beam and a plurality of transverse roof beams extending outwardly and downwardly therefrom to form a ridge, a first roof portion supported on said transverse beams, the upper edge of said roof portion extending to a point spaced from the ridge to form a longitudinal opening, longitudinally spaced hangers, said hangers including vertical angle members mounted on opposite sides of said ridge beam and extending above and below said ridge beam and said first roof portion, and cross members secured to the upper and lower ends of said angle members, said upper cross member being supported by the edge of said first roof portion at longitudinally spaced points, a second roof portion supported on said upper cross members above and spaced from said first roof portion and extending over the adjacent edge of the first roof portion whereby there is an overlap, the overlapping portion forming a longitudinal vent, a raceway supported by said hangers below the ridge, said raceway including a hollow housing below the ridge beam and extending the length thereof, said housing including a bottom wall and side walls extending up to the transverse beams, means forming an air seal between the side walls and the first roof portion, the top of said housing being open and in communication with said longitudinal vent, longitudinally extending air ducts carried in said raceway, a plurality of longitudinally spaced registers formed in said raceway, alternate ones of said registers adapted to communicate with the air ducts and others of said registers adapted to communicate with the vent, a plurality of columns extending upwardly from the ground to engage and support the said roof structure, a floor, a plenum disposed longitudinally beneath the floor, and a plurality of ducts extending between said plenum and the edges of the floor, said ducts adapted to be connected to registers to convey air from the plenum to the registers, said roof and floor forming a building space adapted to receive non-bearing wall portions.

2. A building module adapted to be associated with other modules to form an integrated building plan comprising a roof structure including a longitudinal ridge beam and a plurality of transverse roof beams extending outwardly and downwardly therefrom to form a ridge, a first roof portion extending to a point spaced from the ridge to form a longitudinal opening, longitudinally spaced hangers, said hangers including vertical angle members mounted on opposite sides of said ridge beam and extending above and below said ridge beam and said first roof portion, and cross members secured to the upper and lower ends of said angle members, said upper cross member being supported by the edge of said first roof portion at longitudinally spaced points, a second roof portion supported on said upper cross member above and spaced from said first roof portion and extending over the adjacent edge of the first roof portion whereby there is an overlap, the overlapping portion forming a longitudinal vent, a raceway carried below the ridge by said hangers, said raceway including a hollow housing below the ridge beam and extending the length thereof, said housing including a bottom wall and side walls extending up to the transverse beams, means forming an air seal between the side walls and the first roof portion, the top of said housing being open and in communication with said longitudinal vent, longitudinally extending air ducts carried in said raceway, a plurality of longitudinally spaced registers formed in said raceway, alternate ones of said registers adapted to communicate with the air ducts and others of said registers adapted to communicate with the vents, a plurality of columns extending upwardly from the ground to engage and support the roof structure, a floor, a plenum disposed longitudinally beneath said floor, a plurality of ducts extending between said plenum and the edges of the floor, a plurality of side-by-side panels extending from the edges of the floor to roof serving to form non-bearing side walls, non-bearing end walls serving to enclose the ends of said building, a series of registers affixed along the inside of said side walls and connected to the adjacent ends of the ducts to thereby convey air from the plenum through the registers to the interior of the building, said air flowing upwardly and returning through the return air ducts connected in the raceway, and mechanical means for circulating the air.

3. A building module as in claim 2 wherein said building includes walls disposed at predetermined points within the building space serving to subdivide said space, each longitudinally disposed interior wall section including means for conveying air from one side to the other whereby the air may flow from the outside of the building inwardly and upwardly to the raceway.

References Cited in the file of this patent

UNITED STATES PATENTS

| | | |
|---|---|---|
| 855,160 | Bush | May 28, 1907 |
| 2,060,892 | Pettit | Nov. 17, 1936 |
| 2,187,148 | Fisher | Jan. 16, 1940 |
| 2,214,886 | McKeown | Sept. 17, 1940 |
| 2,263,214 | Larkin | Nov. 18, 1941 |
| 2,272,829 | Bohnsack | Feb. 10, 1942 |
| 2,432,354 | Temple | Dec. 9, 1947 |
| 2,445,920 | Olson | July 27, 1948 |
| 2,512,854 | Edgerly | June 27, 1950 |
| 2,541,784 | Shannon | Feb. 13, 1951 |
| 2,590,123 | Rapp | Mar. 25, 1952 |
| 2,593,424 | Edgerly | Apr. 22, 1952 |
| 2,811,850 | Clary | Nov. 5, 1957 |
| 2,815,831 | Hield | Dec. 10, 1957 |

OTHER REFERENCES

The Architectural Forum. Article by Hewlett, page 96, May 1946.